United States Patent
Bolin et al.

(10) Patent No.: US 12,320,594 B2
(45) Date of Patent: Jun. 3, 2025

(54) HEAT STORAGE USING PHASE CHANGE MATERIAL COATED WITH NANOPARTICLES

(71) Applicant: SaltX Technology AB, Hägersten (SE)

(72) Inventors: Göran Bolin, Stockholm (SE); Corey Blackman, Lidingö (SE)

(73) Assignee: SALTX TECHNOLOGY AB, Hägersten (SE)

( * ) Notice: Subject to any disclaimer, the term of this patent is extended or adjusted under 35 U.S.C. 154(b) by 1023 days.

(21) Appl. No.: 17/414,786

(22) PCT Filed: Dec. 16, 2019

(86) PCT No.: PCT/EP2019/085393
§ 371 (c)(1),
(2) Date: Jun. 16, 2021

(87) PCT Pub. No.: WO2020/127078
PCT Pub. Date: Jun. 25, 2020

(65) Prior Publication Data
US 2022/0082337 A1    Mar. 17, 2022

(30) Foreign Application Priority Data
Dec. 17, 2018   (SE) .................... 1851596-5

(51) Int. Cl.
F28D 20/02 (2006.01)
C09K 5/06 (2006.01)

(52) U.S. Cl.
CPC ............ *F28D 20/023* (2013.01); *C09K 5/063* (2013.01)

(58) Field of Classification Search
None
See application file for complete search history.

(56) References Cited

U.S. PATENT DOCUMENTS

| | | |
|---|---|---|
| 3,393,155 A | 7/1968 | Schutte et al. |
| 4,008,170 A | 2/1977 | Allan |
| 4,754,805 A | 7/1988 | Rothmeyer |
| 4,993,239 A | 2/1991 | Steidl et al. |
| 5,056,591 A | 10/1991 | Spinner et al. |
| 5,440,889 A | 8/1995 | Sippel et al. |
| 6,634,183 B1 | 10/2003 | Jonsson et al. |
| 7,919,184 B2 | 4/2011 | Mohapatra et al. |
| 9,027,633 B2 | 5/2015 | Khodadadi |
| 9,459,026 B2 | 10/2016 | Bolin et al. |
| 9,845,974 B2 | 12/2017 | Bolin et al. |
| 2008/0143331 A1* | 6/2008 | Arik .................. G01R 33/3856 324/318 |
| 2009/0130442 A1* | 5/2009 | Christ ................... C09K 5/063 277/300 |
| 2016/0177156 A1 | 6/2016 | Skrzypski et al. |
| 2016/0251559 A1 | 9/2016 | Bolin et al. |
| 2017/0254601 A1 | 9/2017 | Sutterlin et al. |
| 2020/0002210 A1* | 1/2020 | Liu .................. C04B 33/13 |

FOREIGN PATENT DOCUMENTS

| | | |
|---|---|---|
| CN | 103342991 | 10/2013 |
| CN | 103429972 | 12/2013 |
| CN | 104830278 | 8/2015 |
| CN | 106753261 | 5/2017 |
| CN | 107384327 | 11/2017 |
| CN | 107513375 | 12/2017 |
| CN | 108774499 | 11/2018 |
| KR | 20150123084 | 11/2015 |
| WO | 2007/139476 | 12/2007 |
| WO | 2009/059908 | 5/2009 |
| WO | 2009/102271 | 8/2009 |
| WO | 2012118437 | 9/2012 |

OTHER PUBLICATIONS

International Search Report and Written Opinion for PCT Application No. PCT/EP2019/085393 mailed Mar. 20, 2020.
International Preliminary Report on Patentability for PCT Application No. PCT/EP2019/085393 mailed Feb. 11, 2021.
Ahmed Hassabo et al, "Metal salts rented in silica microcapsules as inorganic phase change materials for textile usage", Inorganic Chemistry: An Indian Journal, IN, (Jan. 1, 2015), vol. 10, No. 2, ISSN 0974-746X, pp. 59-65.
Zhang, Huili & Baeyens, Jan & Cáceres, Gustavo & Degrève, Jan & Lv, Yongqin. (2016). Thermal energy storage: Recent developments and practical aspects. Progress in Energy and Combustion Science. 53. 1-40.
Su, Weiguang, Jo Darkwa, and Georgios Kokogiannakis. 1-38 "Review of solid-liquid phase change materials and their encapsulation technologies." Renewable and Sustainable Energy Reviews 48 (2015): 373-391.
Rao Zhonghao , Liu Chenzhen . Experiment and Analysis of Phase Change Energy Storage . Xuzhou : China University of Mining and Technology Press , 2018. ISBN: 978-7-5646-3953-2.

\* cited by examiner

*Primary Examiner* — Jeffrey D Washville

(74) *Attorney, Agent, or Firm* — Branch Partners PLLC; Bruce E. Black

(57) ABSTRACT

There is provided a method for heat storage comprising charging by raising the temperature of a phase change material (PCM) above its melting temperature and discharging by lowering the temperature below its melting temperature, wherein the phase change material (PCM) is provided in particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$) comprising at least one from graphite, graphite oxide, graphene, and graphene oxide. The particles (P) can be made smaller giving an efficient heat exchange. Their manufacture is easy and cost efficient. The flexible outer layer allows the core to expand and shrink. Corrosion is prevented allowing less expensive materials to be used in devices. The particles can be made self-lubricating.

20 Claims, No Drawings

HEAT STORAGE USING PHASE CHANGE MATERIAL COATED WITH NANOPARTICLES

CROSS-REFERENCE TO RELATED APPLICATIONS

This present application is a U.S. national stage application of PCT Application No. PCT/EP2019/085393, filed Dec. 16, 2019, which claims priority to Swedish Patent Application No. 1851596-5 filed Dec. 17, 2018, both of which are hereby incorporated by reference in their entirety.

TECHNICAL FIELD

The present invention relates to a method of storing heat energy in a phase change material, which is provided in the form of particles surrounded by smaller particles.

BACKGROUND

Both phase change material (PCM) and particles surrounded by smaller particles for instance nanoparticles are known in the art.

"Dry water" is a known material comprising water and hydrophobic nanoparticles. The material is a free-flowing powder that is prepared by mixing water, hydrophobic nanoparticles, e.g. silica derivatives such as silica dimethyl silylate, and air at high speeds. The mixing at high speeds results in a water-in-air emulsion, creating particles where the nanoparticles are arranged enclosing small water droplets, acting as a barrier between the environment and water. The water droplets are separated and prevented from fusing. The emulsion formed is dry and can be poured as a free-flowing powder. The concept of dry water and how it is made has been known since the 1960's, see for example U.S. Pat. Nos. 3,393,155 and 4,008,170.

U.S. Pat. Nos. 9,459,026 and 9,845,974 disclose a particle comprising an inner part and an outer coating, wherein said inner part comprises at least one salt or CaO respectively and said outer coating comprises hydrophobic nanoparticles. Their use in chemical heat pumps working according to the absorption principle is disclosed.

In the prior art phase change materials are known, also in microencapsulated form. Microencapsulated PCMs can for instance be incorporated into other materials or suspended in a continuous medium. Microencapsulated PCMs provide better portability and better heat transfer. The shell of microencapsulated PCMs is typically made of polymeric materials.

CN 106753261 discloses a microcapsule phase change material, comprising a core, wherein the outer side of the core is provided with a wall. The wall comprises a polymeric material. Both the core and the wall contain aluminum nanoparticles and graphite nanoparticles. The objective is to improve the thermal conductivity, reduce the degree of supercooling, and obtain a high density.

U.S. Pat. No. 9,027,633 discloses for instance a thermal energy storage comprising a) a solution comprising nanoparticles and a phase change material, b) a storage. The phase change material is mixed with the nanoparticles to form a mixture.

U.S. Pat. No. 7,919,184 discloses a nanoparticle comprising: A phase change material constituting an inner core of said hybrid nanoparticle and an outer impermeable metal shell. The phase change material comprises one of hydrocarbons, wax, paraffins, salt hydrates, silicones, and polymers.

WO 2009/059908 discloses a thermal energy storage composition comprising: A) particles of an organic phase change material (PCM) as well as B) particles of fire retarding magnesium hydroxide and/or aluminum hydroxide, and/or C) magnesia cement, where the magnesia cement can surround the particles of (A) organic phase change material. There is a polymeric material in the outer shell.

US 2017/0254601 discloses Thermal Energy Storage (TES) systems comprising Phase Change Material (PCMs) compositions for thermal management in different applications such as building, automotive, and industrial applications. There are disclosed TES systems comprising encapsulated PCMs and a heat transfer medium comprising a neutralizing agent and/or an ion exchange resin capable of neutralizing the acidic or basic PCM contained in the capsules, should the PCM permeate the walls of the capsules or otherwise be released into the surrounding heat transfer medium.

KR 20150123084 discloses a heat storage material in the form of a phase-change material (PCM) for storing latent heat, including a particle layer and containing a core. The core is encapsulated by a particle layer. A preparation method comprises: (a) phase-change material (phase change materials; PCM) and an acid anhydride-based emulsifier form an emulsion and (b) a silica compound precursor, functional reacting the compound and the emulsion containing group, and a step of encapsulating the phase change material in the silica nanoparticles with bound functional groups. The functional groups bonded to the nanoparticles give hydrophilic properties.

In KR 20150123084 tests of the thermal conductivity have been conducted. It is stated that the thermal conductivity is good. KR 20150123084 further teaches that if the layer of nanoparticles encapsulating the core is thicker than 20 nm, then the thermal conductivity to and from the phase change material may be impaired. At the same time the layer of nanoparticles must not be thinner than 1 nm because then the phase change material may leak. Thus, KR 20150123084 suggests a thin an calibrated thickness of nanoparticles as encapsulation. The controlled thickness of the nanoparticles which has to be in the range 1-20 nm will give a higher production cost. Nevertheless, there is still a risk of leakage, especially for phase change material with a large thermal expansion coefficient, because then the size of the core will change and the encapsulating layer may not be able to compensate for the variation in size, especially if the layer is not so thick. Further, there is the drawback that the possibilities of heating and cooling the phase change material with a gas flowing in the space around the cores is reduced. A thinner coating layer of nanoparticles will give a smaller void between the cores so that the space for a gas will be lower. The gas will flow in the space between the cores and this space will be larger if there is a thicker coating of nanoparticles. When handling the encapsulated material according to KR 20150123084 there will be some friction in the powder like material.

In the prior art there is further a need for an energy carrier which is easy, simple and economical to store and/or transport. Further, there is a need for an efficient heat exchange with the surrounding. It is desired to manufacture the material in large scale at low cost. It is desired to have a high ratio of phase change material in the particles.

For some microencapsulated phase change materials it is desired to overcome the problems associated with expansion and shrinkage during the use.

For some microencapsulated phase change materials it is desired to reduce the friction in embodiments where the material is to be transported and handled.

SUMMARY

It is an object of the present invention to obviate at least some of the problems in the prior art and to provide an improved method of storing heat as well as a device for storing heat.

In a first aspect there is provided a method for heat storage comprising charging by raising the temperature of a phase change material (PCM) above its melting temperature and discharging by lowering the temperature below its melting temperature, wherein the phase change material (PCM) is provided in particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

In a second aspect there is provided a device for storing energy comprising at least one compartment adapted so that a flow of a heat-transferring medium can flow across the compartment, wherein the at least one compartment comprises particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

In a third aspect there is provided a method for manufacturing a device for storing energy comprising the following steps:
a) mixing at least one phase change material (PCM) with smaller particles ($P_{SMALL}$) so that particles (P) are formed, said particles (P) comprising a core ($C_{PCM}$), said core comprising the at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide, and
b) at least partially filling the particles (P) in at least one compartment adapted so that a flow of a heat-transferring medium can flow across the compartment.

Advantages include that the heat conduction between the phase change material and a surrounding is greatly improved. It is not necessary to have a calibrated coating thickness. The heat conduction is excellent even if the coating is thick, for instance thicker than 20 nm. The production cost is lower because the thickness does not have to be controlled with high precision.

A further advantage is that a thicker coating reduces the risk of leakage and makes it possible to use phase change material with a large thermal expansion coefficient. When the core expands or shrinks the smaller particles in the coating rearrange and adapt to the new size and shape of the core.

This is not possible for a very thin coating such as about 1 nm.

Yet another advantage is that a thick coating gives a larger void between the cores. Such a void is available for a flowing gas, which can be used to heat or cool the phase change material.

Another advantage is a very low friction between coated particles, which facilitates transport and handling of the particles.

The manufacture of the particles utilized in the method is easy and can be performed in large scale at low cost.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term "about" as used in connection with a numerical value throughout the description and the claims denotes an interval of accuracy, familiar and acceptable to a person skilled in the art. Said interval is ±10%.

"Average size" is used in connection with a nanoparticle or a particle to denote the average of the size. The definition is based on replacing a given irregularly shaped particle with an imaginary sphere that has the volume identical with the irregularly shaped particle. This volume-based particle size equals the diameter of the sphere that has same volume as a given irregularly shaped particle.

"Hydrophilic" is used herein to denote the property of attracting water. If the net force between a molecule and a water molecule is attractive (at least at a distance apart), then the molecule is hydrophilic. At a very short distance the net force between molecules will always be repulsive, but for a hydrophilic molecule and water there is a range of distances where there exists a net attractive force.

"Hydrophobic" is used herein to denote the property of being water-repellent, tending to repel and not absorb water. If the net force between a specific molecule and a water molecule is repulsive, then the specific molecule is hydrophobic.

"Largest size" is used herein in connection with particles to denote the longest possible straight line between any two points on the particle surface. For a sphere this is the diameter. For an irregular particle this is the longest length for the particle. For a needle-like particle this is the length of the needle.

"Particle" is used herein to denote a localized object with a volume and a mass.

"Salt" is used herein to denote a compound formed by interaction of equivalent amounts of an acid and a base. The term "salt" as used herein includes alkaline salts, i.e. salts that hydrolyze to produce hydroxide ions when dissolved in water and acid salts, i.e. salts that hydrolyze to produce hydronium ions in water.

In a first aspect there is provided a method for heat storage comprising charging by raising the temperature of a phase change material (PCM) above its melting temperature and discharging by lowering the temperature below its melting temperature, wherein the phase change material (PCM) is provided in particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

If starting with the PCM in solid state it will absorb heat as the external temperature increases. The temperature of the PCM roughly equals the temperature of the surroundings. When the temperature increases and reaches the melting point of the PCM, there is a phase change in the PCM and it begins to melt. During the phase change, the PCM will absorb heat while the temperature does not increase, or only increases to a small extent. The PCM provides a cooling effect during this charging determined by the enthalpy of melting of the PCM. When the temperature is lowered the reverse discharging, cycle occurs. The PCM in its liquid phase will release heat when the temperature lowers and the PCM solidifies. During this discharging phase, the PCM provides a warming effect on its surroundings.

The method comprises charging by melting (i.e. raising the temperature) the phase change material (PCM) and discharging by letting the PCM solidify (i.e. lowering the temperature). During the charging and discharging, the temperature should in practice be a bit over and under the melting temperature of the PCM respectively in order to obtain an efficient melting and solidification in practice. A surrounding temperature at the melting point of the PCM or extremely close to the melting point of the PCM will give a very slow exchange of heat between the PCM and the surroundings and is normally not suitable.

The particles (P) comprise an inner part ($C_{PCM}$) comprising a phase change material coated with an outer layer ($L_{PSMALL}$) comprising smaller particles ($P_{SMALL}$).

The function of the outer layer ($L_{PSMALL}$) is to form a barrier so that direct contact between the phase change material and the surroundings is avoided. When the phase change material is liquid the outer layer ($L_{PSMALL}$) securely keeps the phase change material enclosed. Thus, the layer of smaller particles should be such that surface of the phase change material is covered, i.e. the outer layer is covering the entire core of phase change material. No uncovered patches should be present.

In one embodiment, the outer layer ($L_{PSMALL}$) has a thickness so that the phase change material (PCM) in the core ($C_{PCM}$) cannot be seen through the outer layer ($L_{PSMALL}$). If the surface of the particle (P) is observed, the core ($C_{PCM}$) should not be visible through the smaller particles. It is thus not possible to draw a straight line from the phase change material through the outer layer ($L_{PSMALL}$) without intersecting a smaller particle ($P_{SMALL}$). This is the criteria to determine if the core can be seen through the outer layer. In alternative embodiments the outer layer ($L_{PSMALL}$) is thicker. In one embodiment, the outer layer ($L_{PSMALL}$) is 10 nm or thicker. In one embodiment, the outer layer ($L_{PSMALL}$) is 20 nm or thicker. In one embodiment, the outer layer ($L_{PSMALL}$) is 30 nm or thicker. In one embodiment, the outer layer ($L_{PSMALL}$) is 40 nm or thicker. In one embodiment, the thickness of the outer layer ($L_{PSMALL}$) corresponds to the average largest size of the smaller particles ($P_{SMALL}$). In one embodiment, the thickness of the outer layer ($L_{PSMALL}$) corresponds to twice the average largest size of the smaller particles ($P_{SMALL}$). In one embodiment, the thickness of the outer layer ($L_{PSMALL}$) corresponds to three times the average largest size of the smaller particles ($P_{SMALL}$).

The barrier between the core and the surrounding of the particle (P) are the smaller particles ($P_{SMALL}$). In one embodiment, the outer layer ($L_{PSMALL}$) comprises essentially smaller particles ($P_{SMALL}$). In one embodiment, the outer layer ($L_{PSMALL}$) comprises at least 95 wt % of the smaller particles ($P_{SMALL}$). In one embodiment, the outer layer ($L_{PSMALL}$) comprises at least 99 wt % of the smaller particles ($P_{SMALL}$). In one embodiment, the outer layer ($L_{PSMALL}$) comprises at least 99.5 wt % of the smaller particles ($P_{SMALL}$).

The concept of a barrier layer of smaller particles ($P_{SMALL}$) has several advantages, one advantage is that the outer layer ($L_{PSMALL}$) can change both its shape and to some extent its total area. Thus if the core expands the outer layer ($L_{PSMALL}$) can also expand, since the smaller particles ($P_{SMALL}$) can rearrange and still form a covering layer. This is useful for phase change materials, which change volume during the phase transition. Preferably, the outer layer ($L_{PSMALL}$) is thicker than the thinnest possible barrier forming layer so that the smaller particles ($P_{SMALL}$) can rearrange when the core expands so that the outer layer ($L_{PSMALL}$) still is a barrier and covering the entire core. In one embodiment, the area of the outer layer ($L_{PSMALL}$) can be stretched at least 10% so that the phase change material (PCM) in the core ($C_{PCM}$) still cannot be seen through the outer layer ($L_{PSMALL}$) after the stretching. In one embodiment, the area of the outer layer ($L_{PSMALL}$) can be stretched at least 15% so that the phase change material (PCM) in the core ($C_{PCM}$) still cannot be seen through the outer layer ($L_{PSMALL}$) after the stretching. In one embodiment, the area of the outer layer ($L_{PSMALL}$) can be stretched at least 20% so that the phase change material (PCM) in the core ($C_{PCM}$) still cannot be seen through the outer layer ($L_{PSMALL}$) after the stretching. After the outer layer has expended it still has the required barrier properties. The expansion is perfectly reversible so that the outer layer ($L_{PSMALL}$) can shrink back to its original size when the core returns to its previous size. The flexibility of the outer layer ($L_{PSMALL}$) also has the advantage that the shape of the core can change within boundaries.

In one embodiment, the core ($C_{PCM}$) comprises at least 95 wt % of the phase change material (PCM). Optionally the core comprises heat conductive additives.

In one embodiment, the thickness of the outer layer ($L_{PSMALL}$) is more than the thickness of a monolayer of the smaller particles ($P_{SMALL}$). A monolayer is one layer of particles with essentially the thickness corresponding to the diameter of the particles. For irregular non-spherical particles it is the thickness of a layer of such particles when they do not are placed on top of each other. A monolayer of particles is thinner than a layer comprising several layers of particles.

In one embodiment, heat transfer to or from the particles (P) is performed with a gas as heat carrier. This is an advantage since the gas is able to flow across the particles (P) because of the voids between the particles. The smaller particles create space between the cores of phase change material so that a gas is allowed to flow among the particles (P). The use of smaller particles allow the manufacture of particles (P) with small diameter which in turn creates a high surface area, which in turn is advantageous for a quick heat exchange between the phase change material and the surroundings. If a gas is used as heat carrier the gas can access a large part of the surface and thereby give an efficient heat exchange.

In one embodiment, the charging and discharging is carried out in a compartment, wherein the compartment is connected to a surrounding with at least one filter so that a gas can flow through the compartment, and so that the smaller particles ($P_{SMALL}$) cannot escape from the compartment. In order to prevent any of the smaller particles from escaping from the compartment an inlet and/or outlet can be equipped with a suitable filter with a suitable cut off to keep the particles inside the compartment. Gas with a temperature over and under the melting temperature of the phase change material is allowed to flow through the compartment during charging and discharging respectively.

In one embodiment, the charging and discharging is carried out in a heat exchanger and wherein the particles (P) are transported through the heat exchanger during charging and discharging. During charging the uncharged (i.e. comprising solid PCM) particles (P) are transported through the heat exchanger where they are heated and charged (i.e. the PCM turns into a liquid, at least partially) in a surrounding with a temperature exceeding the melting temperature of the PCM. During discharging the particles (P) are also transported through the heat exchanger and give away their heat to a surrounding with lower temperature than the melting point of the PCM. It is conceived that there in various embodiments can be a first storage for particles (P) from which they are transported to the heat exchanger and to another second storage. The transport can be reversed so that the particles (P) are transported from the second storage to the first storage.

In one embodiment, the heat exchanger design is of the type shell and tube. In such a heat exchanger there is a shell with a plurality of tubes inside it. The particles (P) are typically transported either inside the tubes or inside the shell and another heat transferring fluid is on the other side of the tubes.

The particles (P) are easy to transport since the small particles ($P_{SMALL}$) reduce the friction. Typically, there is a small surplus of small particles ($P_{SMALL}$), i.e. more small particles than necessary to constitute a barrier between the PCM and the surrounding. During the transport a very small amount of the small particles ($P_{SMALL}$) may be left in pipes, compartments, pumps etc. and may help to reduce the friction. The surplus of small particles ($P_{SMALL}$) is sufficient for such lubrication.

The smaller particles ($P_{SMALL}$) are in one embodiment, selected depending on the properties of the phase change material. A polar, i.e. hydrophilic PCM is in one embodiment, matched with hydrophobic smaller particles and vice versa. In one embodiment, the phase change material (PCM) is hydrophilic, i.e. having a net attractive force for a water molecule, and wherein the smaller particles ($P_{SMALL}$) are hydrophobic, i.e. having a net repulsive force for a water molecule.

In an alternative embodiment, the phase change material (PCM) is hydrophobic, i.e. having a net repulsive force for a water molecule, and wherein the smaller particles ($P_{SMALL}$) are hydrophilic, i.e. having a net attractive force for a water molecule.

For mixtures of phase change materials, the hydrophilicity of the mixture is evaluated, i.e. the total force between the mixture and a water molecule. This determines if the smaller particles ($P_{SMALL}$) should be hydrophilic of hydrophobic.

The phase change material (PCM) can be any suitable phase change material.

In one embodiment, the phase change material (PCM) is at least one selected from the group consisting of water, a salt, a hydrate, a salt hydrate, an inorganic compound, and an organic compound. In one embodiment, the phase change material (PCM) is in molten state. In one embodiment, the phase change material (PCM) is solid state.

In one embodiment, the phase change material (PCM) comprises at least one selected from the group consisting of $Na_2SO_4 \cdot 10H_2O$, $NaCl \cdot Na_2SO_4 \cdot 10H_2O$, $Mn(NO_3)_2 \cdot 6H_2O/MnCl_2 \cdot 4H_2O$, $Na_2SiO_3 \cdot 5H_2O$, $NaNO_2$, $NaOH$, $KOH$, $NaNO_3$, $CaCl_2 \cdot 6H_2O$ and $KNO_3$.

In one embodiment, the phase change material (PCM) comprises at least one of the mixtures selected from the group consisting of $NaOH/Na_2CO_3$, $NaCl/NaOH$, $NaCl/KCl/LiCl$, $NaCl/NaNO_3/Na_2SO_4$, $NaCl/NaNO_3$, $NaCl/NaNO_3$, $NaCl/KCl/MgCl_2$, $KNO_3/NaNO_3$, $KNO_3/KCl$, and $KNO_3/KBr/KCl$.

In one embodiment, the phase change material (PCM) comprises a hydrocarbon $C_nH_{2n+2}$ with $14 \leq n \leq 34$.

In one embodiment, the phase change material (PCM) comprises at least one selected from the group consisting of Glycerol trimysristate, Glycerol triplamitate, Glycerol tristearate, Ethylenglycol distearate, Erythritol tetrapalmitate, Erythritol tetrastearate, Galactitol hexapalmitate, Galactitol hexastearate, Tetradecyl tridecanoate, Tetradecyl pentadcanoate, Tetradecyl heptadecanoate, Tetradecyl nonadecanoate, Tetradecyl dodecanoate, Tetradecyl tetradecanoate, Tetradecyl hexadecanoate, Tetradecyl octadecanoate, Tetradecyl eicosanoate, Didecyl carbonate, Dodecyl carbonate, Tetradecyl carbonate, Hexadecyl carbonate, and Octadecyl carbonate.

In one embodiment, the phase change material (PCM) comprises at least one selected from the group consisting of Formic acid, Lauric acid, Caprylic acid, Glycerin, p-Lactic acid, Methyl palmitate, Camphenilone, Docasyl Bromide, Caprylone, Phenol, Cyanamide, Hydrocinnamicacid, Camphene, Nitro Naphthalene, Glyolic acid, Acrylic acid, Phenylacetic acid, Methyl Brombrenzoate, Catechol, Phenol, Heptadecanone, 1-Cyclohexylooctadecane, 4-Heptadacanone, p-Toluidine, Cyanamide, Methyl eicosanate, 3-Heptadecanone, 2-Heptadecanone, Hydrocinnamic acid, Cetyl acid, Camphene, O-Nitroaniline, 9-Heptadecanone, Thymol, Methyl behenate, Diphenyl amine, p-Dichrobenzene, Oxalate, Hypophosphoric acid, O-Xylene dichloride, Chloroacetic acid, Nitro naphthalene, Trimyristin, Heptaudecanoic acid, Bees wax, Glyolic acid, Glycolic acid, p-Bromophenol, Azobenzene, Acrylic acid, Phenylacetic acid, Thiosinamine, Bromcamphor, Methyl brombenzoate, Alpha napthol, Glautaric acid, p-Xylene dichloride, Catechol, Quinone, Actanilide, Succinic anhydride, Benzoic acid, Stibene, Benzamide, Acetic acid, Polyethylene glycol, Capric acid, Eladic acid, Pentadecanoic acid, Tristearin, Myristic acid, Palmatic acid, Stearic acid, Acetamide, and Methyl fumarate.

In one embodiment, the phase change material (PCM) comprises at least one eutectic mixture selected from the group consisting of Lauric-palmistic, Lauric-stearic, Myristic-stearic, Myristic-palmitic, Palmitic-stearic, Carpic-lauric, Capric-palmitic, Capric-myristic, and Capric-stearic.

In one embodiment, the phase change material (PCM) comprises at least one selected from the group consisting of n-Dodecane, n-Tridecane, n-Tetradecane, n-Pentadecane, n-Hexadecane, n-Heptadecane, n-Octadecane, n-Nonodecane, n-Eicosane, n-Heneicosane, n-Docosane, n-Tricosane, n-Tetracosane, n-Pentacosane, n-Hexacosane, n-Heptacosane, and n-Octacosane.

In one embodiment, the phase change material (PCM) comprises at least one selected from the group consisting of n-Butanoic acid, n-Hexanoic acid, n-Octanoic acid, n-Decanoic acid, n-Dodecanoic acid, n-Tridecanoic acid, n-Tetradecanoic acid, n-Pentadecanoic acid, n-Hexadecanoic acid, n-Heptadecanoic acid, n-Octadecanoic acid, n-Nonadecanoic acid, n-Eicosanoic acid, n-Heneicosanoic acid, and n-Tricosanoic acid.

In one embodiment, the phase change material (PCM) comprises at least one selected from the group consisting of ethylene glycol, propylene glycol, and glycerol.

In one embodiment, the particles (P) comprises a pigment so that the particles obtain a desired colour.

In one embodiment the smaller particles ($P_{SMALL}$) comprise any suitable hydrophobic or hydrophilic particles depending on the nature of the phase change material. In one embodiment, the smaller particles ($P_{SMALL}$) comprise at least one material selected from the group consisting of $SiO_2$ and carbon. In one embodiment, the smaller particles ($P_{SMALL}$) comprise hydrophobically modified $SiO_2$. In one embodiment, the smaller particles ($P_{SMALL}$) comprise a material, which is electrostatically modified. In one embodiment, the smaller particles ($P_{SMALL}$) comprise a material comprising charged chemical groups. In one embodiment, the smaller particles ($P_{SMALL}$) comprise hydrophobically modified $SiO_2$, modified with at least one covalently bound hydrophobic compound. A hydrophobic compound is covalently attached to a $SiO_2$ particle.

The smaller particles ($P_{SMALL}$) comprise at least one selected from the group consisting of graphite, graphite oxide, graphene, and graphene oxide. In one embodiment the smaller particles ($P_{SMALL}$) comprise at least one selected from the group consisting of graphite, and graphene. Graphite, graphite oxide, graphene and graphene oxide have good thermal conductivity and improve the heat transfer from the phase change material to the surroundings. The properties such as hydrophobicity of graphene can be tuned depending on the need. Such particles are in one embodiment, mixed with other small particles ($P_{SMALL}$).

The particles (P), i.e. both the core and the outer layer are considerably larger than the smaller particles. In one embodiment, the particles (P) have a largest size in the interval 1-1000 μm.

In one embodiment, the smaller particles ($P_{SMALL}$) have a largest size in the interval 1-500 nm. In another embodiment the smaller particles ($P_{SMALL}$) have a largest size in the interval 1-100 nm. In another embodiment the smaller particles ($P_{SMALL}$) have a largest size in the interval 2-75 nm. In yet another embodiment the smaller particles ($P_{SMALL}$) have a largest size in the interval 5-60 nm.

In one embodiment, heat is transferred from a chemical heat pump to the phase change material (PCM) and/or from the phase change material (PCM) to the chemical heat pump. The principle of the operation of absorption chemical heat pumps is well known; see for example U.S. Pat. Nos. 5,440,889, 5,056,591, 4,993,239, 4,754,805 as well as U.S. Pat. No. 6,634,183. Many chemical heat pumps comprise at least one salt as an active substance and at least one liquid. In addition, other substances can be used. Chemical heat pumps can be used for converting heat to cooling and for storing energy etc. Chemical heat pumps working in accordance to the hybrid principle are used successfully today, see for example WO 2007/139476 and WO/2009/102271. In one embodiment, the phase change material (PCM) also is an absorbing material in a chemical heat pump. Thereby a phase change material has dual use.

In a second aspect there is provided a device for storing energy comprising at least one compartment adapted so that a flow of a heat-transferring medium can flow across the compartment, wherein at least one compartment comprises particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

Such a device is suitable to perform the described method and all embodiments of the method are applicable to the device. It is conceived that the device is equipped with further means to heat and/or cool the heat-transferring medium utilized in the device.

In one embodiment, the compartment comprises at least one inlet and at least one outlet for a heat-transferring medium. In one embodiment, the outlet is covered by a filter with a cut off so that the smaller particles ($P_{SMALL}$) cannot escape from the at least one compartment.

In a third aspect there is provided a method for manufacturing a device for storing energy comprising the following steps:
a) mixing at least one phase change material (PCM) with smaller particles ($P_{SMALL}$) so that particles (P) are formed, said particles (P) comprising a core ($C_{PCM}$), said core comprising the at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide and
b) at least partially filling the particles (P) in at least one compartment adapted so that a flow of a heat-transferring medium can flow across the compartment.

In one embodiment, the mixing in step a) is carried out when the phase change material (PCM) is liquid. The particles (P) are in one embodiment, manufactured so that the phase change material (PCM) in liquid form is mixed with the desired smaller particles ($P_{SMALL}$). The PCM is heated until its viscosity is low and then mixed with the smaller particles ($P_{SMALL}$).

In an alternative embodiment, the mixing in step a) is carried out when the phase change material (PCM) is solid. The particles (P) are in one embodiment, manufactured so that the phase change material (PCM) in solid form is mixed with the desired smaller particles ($P_{SMALL}$). The PCM in solid form is in one embodiment, crushed to the desired particle size and then thoroughly mixed with the smaller particles ($P_{SMALL}$).

When the phase change material (PCM) is mixed with the smaller particles ($P_{SMALL}$) with sufficient energy, then particles (P) will be formed.

In one embodiment, the mixing is carried out in a standard household blender for 10-120 seconds. Other types of mixing are also encompassed. The sufficiency of the mixing can be observed by noting if particles form. If a liquid PCM is used, the liquid shall turn into a dry and free flowing powder, then the mixing has been sufficient.

Suitable ratios between the phase change material (PCM) with the smaller particles ($P_{SMALL}$) include but are not limited to 95 wt % of phase change material with 5 wt % smaller particles, 98 wt % of phase change material with 2 wt % smaller particles, 99 wt % of phase change material with 1 wt % smaller particles, 90 wt % of phase change material with 10 wt % smaller particles, and 85 wt % of phase change material with 15 wt % smaller particles. It is an advantage of the invention that a high fraction of PCM is possible. It is conceived that small amounts of impurities may be present in the phase change material and/or the smaller particles.

If a hydrophilic phase change material is used and hydrophobic smaller particles are used, then the particles (P) should float if put on the surface of water. It is possible to test manufactured particles after coating by gently placing a sample of particles on the surface of water. If the particles float on the air-water surface the particles are good. If the particles do not float, something with the manufacturing process may be wrong.

If a hydrophilic phase change material is used and hydrophobic smaller particles are used, and without wishing to be bound by any particular scientific theory, then the inventor believe that the smaller particles ($P_{SMALL}$) are attracted to the PCM core of the particle by an attractive force (Debye force) between a dipole and an induced dipole. In this case, the PCM displays a dipole, whereas the smaller particles ($P_{SMALL}$) possess a polarizability. Thus, the smaller particles ($P_{SMALL}$) are preferably chosen from materials that are polarizable, if the PCM displays a dipole. In one embodiment, the smaller particles ($P_{SMALL}$) comprise a material that is polarizable. Polarizability is the ability to form instantaneous dipoles. Highly polarizable compounds are hydrophobic compounds, i.e. non-polar compounds.

EXAMPLE

The mixing step was carried out using a high-speed mixer with rotational speed over 40 000 rpm. PCM material comprising $CaCl_2$ was oven dried at 120° C. The material was then hydrated with 4 moles of water in a humidity chamber for 4 hours at a temperature of 40° C. and relative humidity over 60%. 90 wt-parts of the hydrated $CaCl_2$ of particle size ranging from 300 μm to 600 μm were then mixed with 10 wt-parts of smaller hydrophobic $SiO_2$ particles of diameter between 10 nm and 20 nm. The mixing process was carried out for up to 2 minutes yielding 200 g of material. The relationship between salt particles and small particles is only such as to ensure adequate mixing and can thus be adjusted to suitable levels based on the application.

The invention claimed is:

1. A method for heat storage comprising charging by raising the temperature of a phase change material (PCM) above its melting temperature and discharging by lowering the temperature below its melting temperature, wherein the phase change material (PCM) is provided in particles (P) comprising a core ($C_{PCM}$), said core ($C_{PCM}$) comprising at least one phase change material (PCM), said core ($C_{PCM}$) having a particulate outer layer ($L_{PSMALL}$) of smaller particles ($P_{SMALL}$) directly coated onto the core, wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

2. The method according to claim 1, wherein the outer layer ($L_{PSMALL}$) has a thickness so that it is not possible to draw a straight line from the phase change material (PCM) through the outer layer ($L_{PSMALL}$) without intersecting at least one smaller particle ($P_{SMALL}$).

3. The method according to claim 1, wherein the outer layer ($L_{PSMALL}$) comprises at least 95 wt % of the smaller particles ($P_{SMALL}$).

4. The method according to claim 1, wherein the area of the outer layer ($L_{PSMALL}$) can be stretched at least 10% so that the phase change material (PCM) in the core ($C_{PCM}$) still not possible to draw a straight line from the phase change material (PCM) through the outer layer ($L_{PSMALL}$) without intersecting at least one smaller particle ($P_{SMALL}$).

5. The method according to claim 1, wherein the thickness of the outer layer ($L_{PSMALL}$) is more than the thickness of a monolayer of the smaller particles ($P_{SMALL}$).

6. The method according to claim 1, wherein the core ($C_{PCM}$) comprises at least 95 wt % of the phase change material (PCM).

7. The method according to claim 1, wherein heat transfer to or from the particles (P) is performed with a gas as heat carrier.

8. The method according to claim 1, wherein the charging and discharging is carried out in a compartment, wherein the compartment is connected to a surrounding with at least one filter so that a gas can flow through the compartment, and so that the smaller particles ($P_{SMALL}$) cannot escape from the compartment.

9. The method according to claim 1, wherein the charging and discharging is carried out in a heat exchanger and wherein the particles (P) are transported through the heat exchanger during charging and discharging respectively.

10. The method according to claim 1, wherein the smaller particles ($P_{SMALL}$) comprise at least one material selected from the group consisting of $SiO_2$ and carbon.

11. The method according to claim 1, wherein the smaller particles ($P_{SMALL}$) comprise hydrophobically modified $SiO_2$.

12. The method according to claim 1, wherein the smaller particles ($P_{SMALL}$) comprise hydrophobically modified $SiO_2$, modified with at least one covalently bound hydrophobic compound.

13. The method according to claim 1, wherein the phase change material (PCM) is hydrophilic, i.e. having a net attractive force for a water molecule, and wherein the smaller particles ($P_{SMALL}$) are hydrophobic, i.e. having a net repulsive force for a water molecule.

14. The method according to claim 1, wherein the phase change material (PCM) is hydrophobic, i.e. having a net repulsive force for a water molecule, and wherein the smaller particles ($P_{SMALL}$) are hydrophilic, i.e. having a net attractive force for a water molecule.

15. The method according to claim 1, wherein heat is transferred from a chemical heat pump to the phase change material (PCM) and/or from the phase change material (PCM) to the chemical heat pump.

16. The method according to claim 15, wherein the phase change material (PCM) also is an absorbing material in the chemical heat pump.

17. A device for storing energy comprising at least one compartment adapted so that a flow of a heat-transferring medium can flow across the compartment, wherein the at least one compartment comprises particles (P) comprising a core ($C_{PCM}$), said core ($C_{PCM}$) comprising at least one phase change material (PCM), said core ($C_{PCM}$) being coated with an outer layer ($L_{PSMALL}$) of smaller particles ($P_{SMALL}$), wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide.

18. A method for manufacturing a device for storing energy comprising the following steps:
   mixing at least one phase change material (PCM) with smaller particles ($P_{SMALL}$) so that particles (P) are formed, said particles (P) comprising a core ($C_{PCM}$), said core comprising the at least one phase change material (PCM), said core ($C_{PCM}$) being coated with an outer layer ($L_{PSMALL}$) of smaller particles ($P_{SMALL}$) wherein the particles (P) have a largest size in the interval 1-1000 μm, wherein the smaller particles ($P_{SMALL}$) have a largest size in the interval 1-500 nm, and wherein the smaller particles ($P_{SMALL}$) comprise at least one selected from the group consisting of graphite, graphite oxide, graphene, and graphene oxide, and
   at least partially filling the particles (P) in at least one compartment adapted so that a flow of a heat-transferring medium can flow across the compartment.

19. The method according to claim 18, wherein mixing in step a) is carried out when the phase change material (PCM) is liquid.

20. The method according to claim 18, wherein mixing in step a) is carried out when the phase change material (PCM) is solid.

* * * * *